US012810372B2

(12) United States Patent
Sun et al.

(10) Patent No.: US 12,810,372 B2
(45) Date of Patent: Nov. 24, 2026

(54) IMAGE COLLECTION METHOD AND APPARATUS, TERMINAL, AND STORAGE MEDIUM

(71) Applicant: Beijing Bytedance Network Technology Co., Ltd., Beijing (CN)

(72) Inventors: Zhenjiang Sun, Beijing (CN); Hui Li, Beijing (CN); Tong Wang, Beijing (CN); Jun Li, Beijing (CN); Sheng Zhang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 635 days.

(21) Appl. No.: 18/249,160

(22) PCT Filed: Sep. 26, 2021

(86) PCT No.: PCT/CN2021/120652
§ 371 (c)(1),
(2) Date: Apr. 14, 2023

(87) PCT Pub. No.: WO2022/078190
PCT Pub. Date: Apr. 21, 2022

(65) Prior Publication Data

US 2023/0394614 A1 Dec. 7, 2023

(30) Foreign Application Priority Data

Oct. 15, 2020 (CN) ......................... 202011102914.0

(51) Int. Cl.
*G06T 1/00* (2006.01)
*G06T 7/70* (2017.01)
(Continued)

(52) U.S. Cl.
CPC .............. *G06T 1/0007* (2013.01); *G06T 7/70* (2017.01); *G06V 40/107* (2022.01); *G10L 15/08* (2013.01);
(Continued)

(58) Field of Classification Search
None
See application file for complete search history.

(56) References Cited

U.S. PATENT DOCUMENTS 9,678,657 B2 * 6/2017 Matsuzawa ............. G06F 3/005
2013/0106892 A1 * 5/2013 Davis .................... G06F 3/0304
345/589

(Continued)

FOREIGN PATENT DOCUMENTS

CN 106385537 A 2/2017
CN 106803882 A 6/2017

(Continued)

OTHER PUBLICATIONS

International Patent Application No. PCT/CN2021/120652; Int'l Search Report; dated Dec. 17, 2021; 3 pages.

(Continued)

*Primary Examiner* — Andrew W Bee
*Assistant Examiner* — Christine Zhao
(74) *Attorney, Agent, or Firm* — BakerHostetler

(57) ABSTRACT

Provided in the present disclosure are an image collection method and apparatus, a terminal, and a storage medium. Provided in some embodiments of the present disclosure is an image collection method, which is used in an image collection apparatus and comprises: acquiring voice information; determining whether the voice information satisfies a first preset condition; if the voice information satisfies the first preset condition, determining the location of a target object; and according to the location of the target object, (Continued)

performing image capture on the target object so as to obtain an image of the target object. In the method of the present disclosure, when a target object needs to be shown to another person, the user does not need to manually operate the image collection apparatus for the other person to conveniently view the target object, thereby freeing both hands and improving convenience.

20 Claims, 4 Drawing Sheets

(51) Int. Cl.
*G06V 40/10* (2022.01)
*G10L 15/08* (2006.01)
*G10L 15/22* (2006.01)

(52) U.S. Cl.
CPC .... *G10L 15/22* (2013.01); *G06T 2207/10148* (2013.01); *G10L 2015/088* (2013.01)

(56) References Cited

U.S. PATENT DOCUMENTS

| | | | | |
|---|---|---|---|---|
| 2016/0191812 | A1 | 6/2016 | Tsubusaki | |
| 2016/0323499 | A1 * | 11/2016 | Wei | H04N 23/611 |
| 2017/0060828 | A1 * | 3/2017 | Rainisto | G06F 40/169 |
| 2017/0177197 | A1 * | 6/2017 | Waggoner | G06F 3/167 |
| 2017/0308763 | A1 | 10/2017 | Salmelin et al. | |
| 2020/0117335 | A1 | 4/2020 | Mani et al. | |

FOREIGN PATENT DOCUMENTS

| | | | | |
|---|---|---|---|---|
| CN | 107888833 | A | 4/2018 | |
| CN | 107924392 | A | 4/2018 | |
| CN | 109872297 | A | 6/2019 | |
| CN | 109963073 | A | 7/2019 | |
| CN | 110192168 | A | 8/2019 | |
| CN | 110213492 | A * | 9/2019 | H04N 23/695 |
| CN | 110418064 | A | 11/2019 | |
| CN | 110602391 | A | 12/2019 | |
| CN | 110604579 | A | 12/2019 | |
| CN | 110809115 | A | 2/2020 | |
| CN | 111212226 | A | 5/2020 | |
| CN | 111328447 | A | 6/2020 | |
| CN | 111491212 | A | 8/2020 | |
| CN | 111586318 | A | 8/2020 | |
| CN | 114374815 | B | 4/2023 | |
| KR | 10-2112517 | B1 | 6/2020 | |

OTHER PUBLICATIONS

Gui, Zhen-Wen et al.; "A Novel Image Recognition Algorithm for Smartphones"; ACTA Electronica Sinica; vol. 42 No. 8; Aug. 2014; p. 1487-1494 (English Abstract Only).

International Patent Application No. PCT/CN2021/120652; Int'l Written Opinion; dated Dec. 17, 2021; 8 pages.

International Search Report for International Application No. PCT/CN2021/117199, mailed Dec. 17, 2021, 5 pages.

* cited by examiner

IMAGE COLLECTION METHOD AND APPARATUS, TERMINAL, AND STORAGE MEDIUM

CROSS-REFERENCE TO RELATED APPLICATION

This application is the U.S. National Stage of International Application No. PCT/CN2021/120652, filed on Sep. 26, 2021, which claims priority to Chinese patent application No. 202011102914.0 with a filing date of Oct. 15, 2020 and a title of "IMAGE COLLECTION METHOD AND APPARATUS, TERMINAL, AND STORAGE MEDIUM", the entire contents of both of which are incorporated herein by reference.

TECHNICAL FIELD

The present disclosure relates to the technical field of image collection, in particular to an image collection method and apparatus, a terminal, and a storage medium.

BACKGROUND

An image collection apparatus such as a camera is often used at present to capture and transmit video images. Actual capture application scenarios are rich and varied. The existing image collection apparatuses cannot meet the requirements of specific scenarios well, and have the problem of low operation efficiency, poor capture effect, etc.

SUMMARY

The present disclosure provides an image collection method and apparatus, a terminal, and a storage medium.

The present disclosure uses the following technical solutions.

In some embodiments, the present disclosure provides an image collection method used for an image collection apparatus, comprising:

acquiring voice information;

determining whether the voice information satisfies a first preset condition;

determining the position of a target object if the voice information satisfies the first preset condition; and capturing the target object according to the position of the target object to obtain an image of the target object.

In some embodiments, the present disclosure provides an image collection method, used for an image collection apparatus, comprising:

acquiring an image of a preset object;

determining the position of a target object according to the image of the preset object; and capturing the target object according to the position of the target object to obtain an image of the target object.

In some embodiments, the present disclosure provides an image collection apparatus, comprising:

a voice unit, configured to acquire voice information;

an identification unit, configured to determine whether the voice information satisfies a first preset condition;

a positioning unit, configured to determine the position of a target object if the voice information satisfies the first preset condition; and a capture unit, configured to capture the target object according to the position of the target object to obtain an image of the target object.

In some embodiments, the present disclosure provides an image collection apparatus, comprising:

an acquisition module, configured to acquire an image of a preset object;

a positioning module, configured to determine the position of a target object according to the image of the preset object; and a capture module, configured to capture the target object according to the position of the target object to obtain an image of the target object.

In some embodiments, the present disclosure provides a terminal, comprising: at least one memory and at least one processor, wherein the at least one memory is configured to store program codes, and the at least one processor is configured to call the program codes stored in the at least one memory to perform the method according to any one of above.

In some embodiments, the present disclosure provides a storage medium storing program codes, the program codes used to perform the method according to any one of above.

According to the image collection method provided by some embodiments of the present disclosure, a target object can be positioned when the acquired voice information satisfies a first preset condition, the target object is captured to obtain an image of the target object, and when the target object needs to be displayed to others, the others can conveniently view the target object without manually operating an image collection apparatus by the user, thereby freeing user's hands and improving convenience. In other embodiments of the present disclosure, an image of a preset object is acquired, the position of the target object is determined according to the image of the preset object, the target object is captured according to the position of the target object, and when the target object needs to be displayed, the target object can be captured naturally by controlling the preset object. The whole process does not need to pause, and does not need to manually operate the image collection apparatus, thereby improving the convenience and smoothness of the display process.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

DETAILED DESCRIPTION OF PREFERRED EMBODIMENTS

Figure 1:
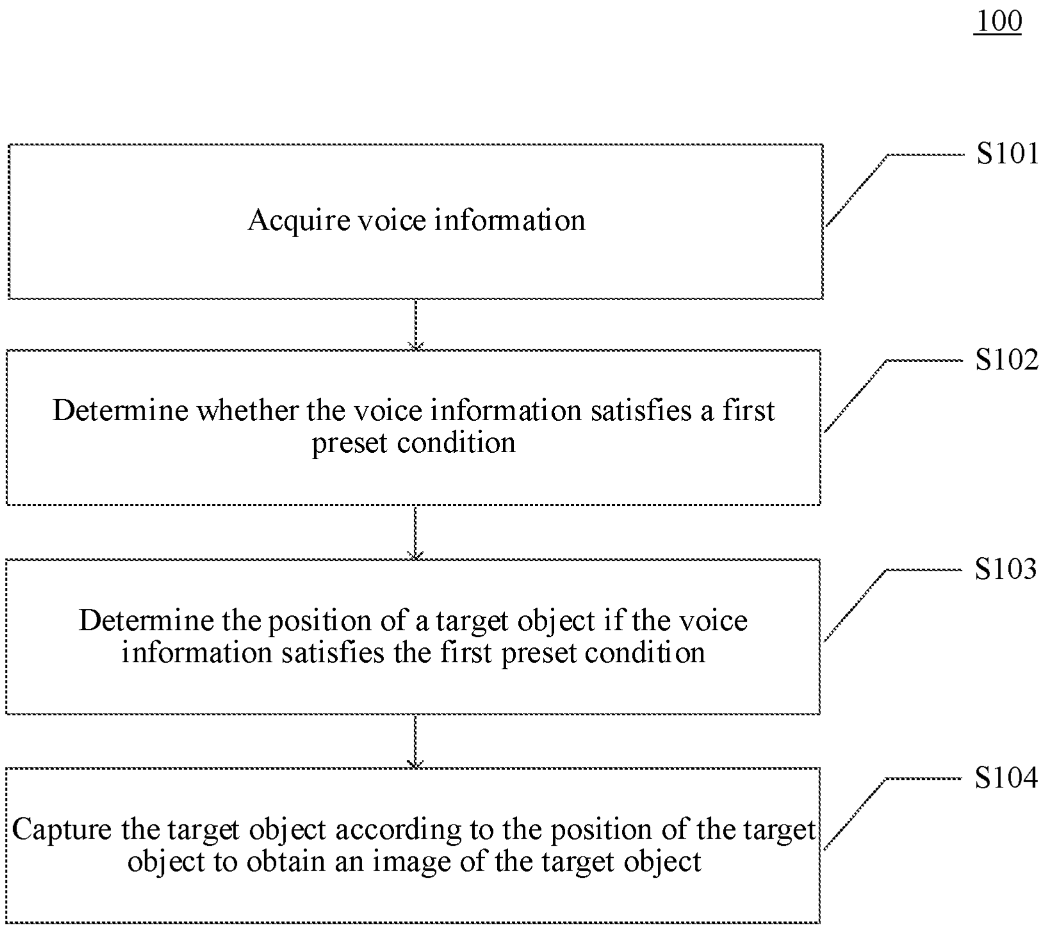
FIG. 1 is a flowchart of an image collection method 100 according to an embodiment of the present disclosure.

Embodiments of the present disclosure will be described in greater detail below with reference to the accompanying drawings. While certain embodiments of the present disclosure are shown in the accompanying drawings, it should be understood that the present disclosure may be implemented in various forms and should not be construed as being limited to the embodiments set forth herein, but instead are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in sequence and/or in parallel. In addition, the method embodiments may include additional steps and/or omit to perform the steps illustrated. The scope of the present disclosure is not limited in this regard.

As used herein, the term "including" and variations thereof are open-ended, i.e., "including, but not limited to". The term "based on" is "based, at least in part, on". The term "an embodiment" means "at least one embodiment"; the term "another embodiment" means "at least one additional embodiment"; the term "some embodiment" indicates "at least some embodiments". Definitions of other terms will be given in the description below.

Note that the concepts "first" and "second" mentioned in this disclosure are used only to distinguish between different devices, modules or units, and are not intended to define the order or interdependence of the functions performed by these devices, modules or units.

It should be noted that the reference to "one" in this disclosure is intended to be schematic and not limiting, and it should be understood by those skilled in the art to mean "one or more" unless the context clearly indicates otherwise.

The names of the messages or information interacting between the multiple devices in this disclosure are for illustrative purposes only and are not intended to limit the scope of those messages or information.

Sometimes an image collection apparatus is needed for image collection during work and life. For example, an image collection apparatus is needed for image collection during video conferences or live streaming Taking the video conferences or live streaming as an example, sometimes exhibits need to be displayed, and the exhibits also need to be closed up in some cases to show details. In related technologies, a camera often needs to be manually adjusted to adapt to different shooting scenarios, such as shooting target objects or closing up articles to be displayed, user operation is required, resulting in the user's hands being occupied, which is very inconvenient during video conferences or live streaming.

To solve at least in part the above problems, some embodiments of the present disclosure provide an image collection method, which may be used in an image collection apparatus. The image collection apparatus may be, for example, an image collection apparatus having a zoom camera. The solution provided by the embodiments of the present disclosure will be described in detail below with reference to the accompanying drawings.

As shown in FIG. 1, which is a flowchart of an image collection method 100 according to an embodiment of the present disclosure, the image collection method 100 in this embodiment includes the following steps S101-S104.

S101, voice information is acquired.

In some embodiments, the image collection apparatus may be equipped with a voice acquisition apparatus, such as a microphone, for acquiring voice information. In other embodiments, the image collection apparatus may acquire voice information from other apparatus over a network, for example, the voice acquisition apparatus is in communication connection with the image collection apparatus, and the voice acquisition apparatus acquires voice information and then transmits the same to the image collection apparatus.

S102, whether the voice information satisfies a first preset condition is determined.

In some embodiments, the first preset condition may be, for example, that the voice information includes specific words, or the accent of the voice information is identified, and the identified voice is the accent of a specific user. In this embodiment, the first preset condition is not specifically limited.

S103, the position of a target object is determined if the voice information satisfies the first preset condition.

In some embodiments, the voice information satisfies the first preset condition, and then the position of the target object is obtained. The target object may be, for example, an object that needs to be displayed or closed up, a person who needs to be displayed or closed up, such as a product to be introduced in live streaming, a user's face after using a specific beauty product, or a sample to be displayed in a video conference. The position of the target object may be represented by coordinates. In some embodiments, if the voice information does not satisfy the first preset condition, steps S101 and S102 are repeated until the acquired voice information satisfies the first preset condition.

S104, the target object is captured according to the position of the target object to obtain an image of the target object.

In some embodiments, after the position of the target object is obtained, the image collection apparatus automatically adjusts its camera to capture the image of the target object, for example, to focus on and zoom in the image of the target object or close up the target object, so that the image of the target object can be clearly captured for convenience of viewing. In other embodiments, when the focal length of the image collection apparatus before capturing the target object is just suitable for capturing the target object, the shooting angle of the image collection apparatus can be directly adjusted to capture the target object. In other embodiments, before the target object is captured, another smaller object may be closed up, and the target object is larger than the object being closed up, so the focal length needs to be adjusted appropriately to decrease the magnification and magnify the current field of view. In the embodiment of the present disclosure, when the target object needs to be captured, manual operation of the user is not needed, so that user's hands can be freed and convenience can be improved. In some embodiments, the provided image collection method further includes: sending the captured image to a target terminal for playing. The target terminal may be, for example, a terminal in communication connection with the image collection apparatus to view the captured image. For example, when the method provided in the embodiment of the present disclosure is used for a remote video conference, the target terminal may be a terminal of a participant of the remote conference to view the captured image. When the method provided in the embodiment of the present disclosure is used for live streaming, the target terminal may be, for example, a terminal used by a viewer watching the live streaming.

Hereinafter, the method 100 provided in the embodiment of the present disclosure is used for a video live streaming sales scenario as an example to describe an embodiment of the present disclosure. During video live streaming sales, an anchor uses an image collection apparatus for selfie, and introduces goods. In order to make audiences have a clearer understanding when introducing the goods, the anchor usually adjusts the camera to capture the goods. In related technologies, the user needs to manually adjust the camera to capture goods, which is inconvenient. With the method provided in some embodiments of the present disclosure, when the anchor needs to capture goods, the anchor sends out voice information, and the image collection apparatus acquires the voice information and determines whether the voice information satisfies the first preset condition. When the first preset condition is satisfied, the image collection apparatus acquires the position of goods and automatically adjusts the camera to capture the image of the goods, so that the anchor does not need to manually adjust the image collection apparatus in the live streaming process, thus freeing hands and facilitating the introduction of goods.

As can be seen from the above, with the image collection method provided in some embodiments of the present disclosure, the user can send out voice information, and the image collection apparatus determines the position of the target object and captures the target object. When the target object needs to be displayed to others, the others can conveniently view the target object without manually operating the image collection apparatus by the user.

In some embodiments of the present disclosure, determining whether the voice information satisfies a first preset condition in step S102 includes: determining whether the voice information includes preset keywords; if the voice information includes the keywords, the first preset condition is satisfied; or, if the voice information does not include the keywords, the first preset condition is not satisfied. In this embodiment, keywords are preset. When the user desires to capture an image of the target object, voice information can be sent out to say the keywords, so as to capture the image of the target object. The keywords in this embodiment may be set by the user, for example, words such as "physical display", "look here", "look left", and "look right".

In some embodiments of the present disclosure, determining the position of a target object in step S103 includes: acquiring a body image of a user and determining the position of the target object according to the body image of the user. In this embodiment, the body image of the user may be a partial body image of the user or a whole body image of the user. When the user desires to introduce the target object, the user's body often performs corresponding actions, which identify the position of the target object, so the position of the target object can be determined according to the body image of the user. For example, the user usually points to the target object with his finger, or the user's eyes look at the target object. At this time, the position of the target object can be determined according to the pointing of the user's finger or the direction of the user's line of sight.

In some embodiments of the present disclosure, determining the position of the target object according to the body image of the user includes: determining whether the body image includes a feature point of a target limb; if the body image includes the feature point of the target limb, determining the position of the target object according to the position of the feature point of the target limb; or, if the body image does not include the feature point of the target limb, re-acquiring a body image of the user. In this embodiment, whether the body image includes the target limb may be determined first, and the feature point of the target limb is determined in the case of including the target limb. In this embodiment, the target limb is preset. The target limb may be a limb related to the target object, for example, may be a limb operating the target object. For example, the target limb may be set to include at least one of a hand and an arm. Generally, when the target object needs to be displayed, the user points to the target object with his finger or holds the target object by hands, so the position of the target object can be determined by the position of the feature point of the target limb.

In some embodiments, determining the position of the target object according to the position of the feature point of the target limb may include, for example: positioning a target range with the feature point of the target limb as the center of a circle and a preset distance as the radius, positioning the target object within the target range, and then determining the position of the target object. In this embodiment, considering that the user usually uses the target limb (e.g. a hand) to point to or hold the target object, the target object is usually located near the feature point of the target limb, so the target object can be searched and positioned near the feature point of the target limb. In this way, the speed of determining the position of the target object can be improved and the computing resources can be saved.

In some embodiments of the present disclosure, capturing the target object to obtain an image of the target object includes: adjusting an angle of view during capturing, and/or adjusting a focal length during capturing, to capture the target object. In this embodiment, the target object may not be located in the current field of view before the target object is captured, and the focal length used may not be appropriate, so the angle of view and/or the focal length for capturing need to be adjusted when the target object is captured, which improves the capturing effect. In some embodiments, a controller for communication connection may be configured for image collection in advance, and in response to control information sent by the controller, the angle of view and/or the focal length during capturing are adjusted according to the control information. In some embodiments, because most of the field of view is occupied by the target object when the target object is captured, the user controlling the angle of view and/or the focal length through the controller is not captured by the image collection apparatus, which helps the user to select the appropriate angle of view and/or focal length.

In some embodiments of the present disclosure, the angle of view during capturing is adjusted, so that the target object is located in the middle of the captured image. In some embodiments, the target object is captured in order to display the target object, so the angle of view during capturing is adjusted to display the target object more clearly. For example, the angle of view can be adjusted, so that the coordinates of the target object are located in the center of the captured image, and the target object is located in the middle of the captured image. For example, a target angle of view is computed with the coordinates of the target object as the center, and then the angle of view of the image collection apparatus is adjusted to the target angle of view. In some embodiments of the present disclosure, the focal length is adjusted to increase the magnification during capturing. In some embodiments, when the target object is captured to show details of the target object so that others can view the details and close-up of the target object at short range, the focal length needs to be adjusted to increase the magnification during capturing, so as to magnify the image of the target object. Increasing the magnification during capturing here indicates that the magnification of the image collection apparatus when the target object is captured is greater than the magnification of the image collection apparatus before the target object is captured, for example, if the magnification of the image collection apparatus when the voice information is acquired is 1, the magnification when the target object is captured should be greater than 1. By increasing the magnification, the image of the captured target object can be magnified, so that the details of the target object can be captured and the target object can be closed up. Taking the method provided in the embodiment of the present disclosure for a video conference as an example, during the video conference, the camera captures an image of a participant and transmits the image to other remote participants, where the image collection apparatus is currently capturing the participant at a magnification of 1. When the details of an exhibit need to be shown, the participant sends out voice information to control the image collection apparatus to increase the magnification to 3 times, so as to capture the details of the exhibit in close range and allow the remote participants to see the details of the exhibit. In addition, manual operation by the participant is not needed, which frees the hands of the participant and improves the convenience.

In some embodiments of the present disclosure, adjusting a focal length during capturing includes: adjusting the focal length during capturing according to the size of a display screen, where the display screen is used for displaying the captured image. In this embodiment, the focal length of the image collection apparatus during capturing is related to the size of the display screen for display, for example, the focal length during capturing may be set and adjusted, so that the size of the image of the captured target object on the display screen is not less than a target size, and/or the ratio of the area of the image of the captured target object on the display screen to the area of the display screen is not less than a target ratio. For example, the focal length is adjusted, so that the size of the captured target object in the horizontal and vertical directions of the display screen is not less than 10 cm. In addition, the area of the image of the captured target object is set to be not less than 75% of the area of the display screen. In this way, when the size of the display screen is small, the focal length can be automatically adjusted to ensure that the captured image of the target object is large enough, and when the size of the display screen is large, the focal length can be automatically adjusted with the area of the display screen, without causing the captured image of the target object to be too small.

In some embodiments of the present disclosure, a voice instruction is acquired, and the angle of view and/or focal length during capturing are adjusted according to the voice instruction. In some embodiments, the angle of view and/or focal length when the target object is captured may be controlled by voice and further adjusted, where the voice instruction may be included in the voice information, and the user may send out voice information including the voice instruction.

In some embodiments of the present disclosure, after step S104, the method further includes: acquiring voice information again; determining whether the voice information acquired again satisfies a second preset condition; and adjusting the image collection apparatus to a first state if the voice information acquired again satisfies the second preset condition, where the first state is a state of the image collection apparatus before the target object is captured to obtain an image of the target object. In this embodiment, after the target object is captured, the target object may not be captured any more. Then, the image collection apparatus may be controlled by sending out voice information to return to the first state thereof before step S104. The second preset condition in this embodiment may be, for example, that the voice information acquired again includes preset target words. When it is identified that the voice information acquired again includes the target words, the state of capturing the target object is exited, and the first state before step S104 is returned, for example, the angle of view and focal length of the image collection apparatus before step S104 may be recorded, and the angle of view and focal length of the image collection apparatus are adjusted to the angle of view and focal length recorded before step S104. In other embodiments, the user captured by the image collection apparatus and the focal length used before step S104 may be recorded, and when the voice information acquired again satisfies the second preset condition, the image collection apparatus is controlled to capture the recorded user again at the recorded focal length.

Figure 2:
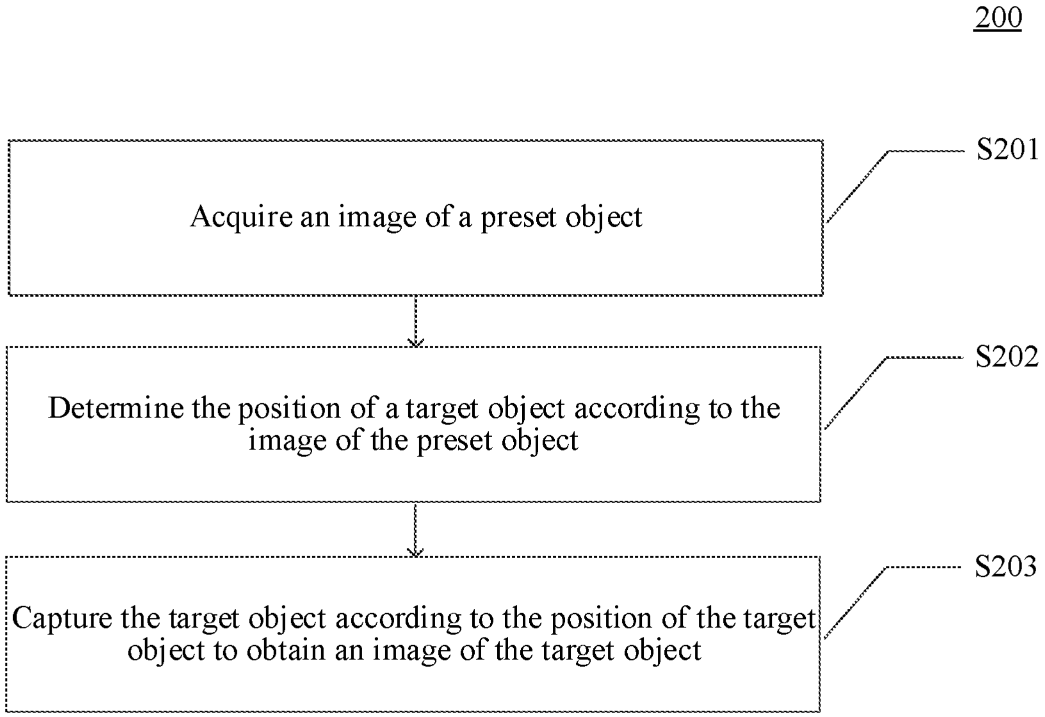
FIG. 2 is a flowchart of an image collection method 200 according to an embodiment of the present disclosure.
Figure 3:
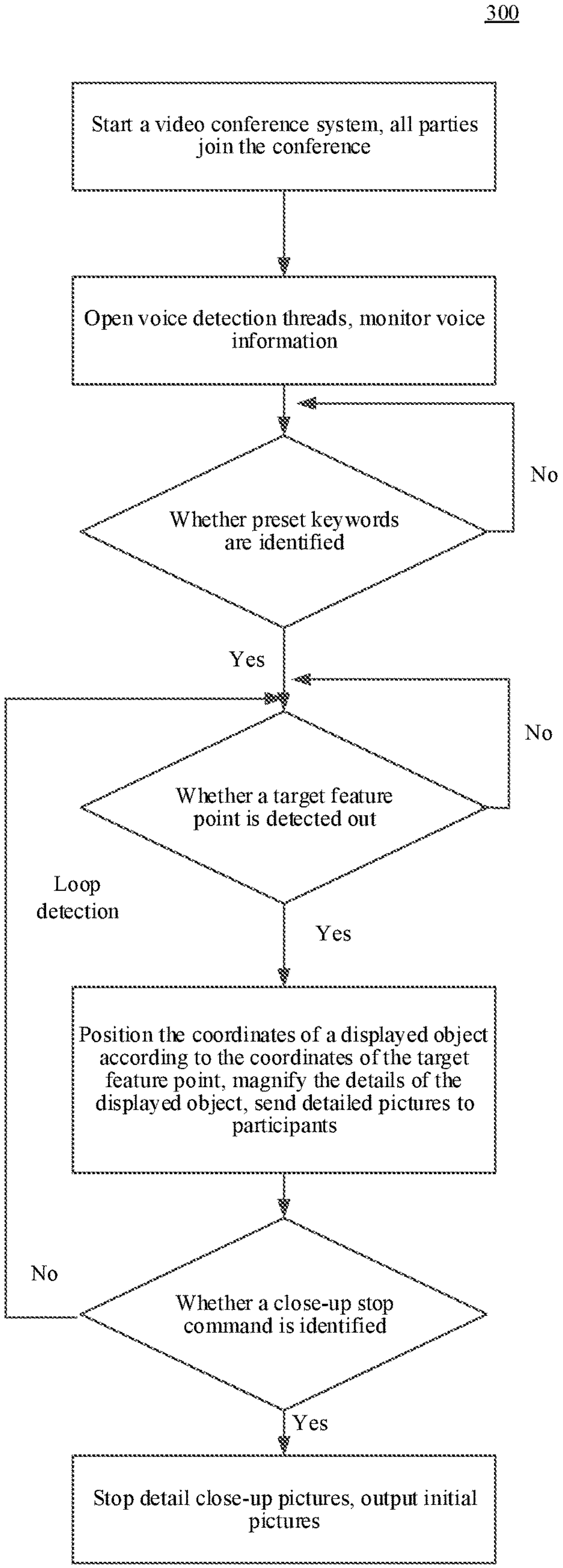
FIG. 3 is a schematic diagram of an image collection method 300 according to an embodiment of the present disclosure.

In some embodiments of the present disclosure, as shown in FIG. 2, another image collection method 200 for an image collection apparatus is provided, including steps S201 to S203 as follows.

S201, an image of a preset object is acquired.

In some embodiments, the preset object may be a preset article or part or all of the user's body, so the image of the preset object may be an image of the preset article or a body image of the preset user, which is not limited.

S202, the position of a target object is determined according to the image of the preset object.

In some embodiments, after the image of the preset object is acquired, the target object is positioned based on the image of the preset object. The position of the target object may be represented by coordinates. The target object may be, for example, an object to be displayed or closed up, such as a product to be introduced in live streaming, or a sample to be displayed in a video conference.

S203, the target object is captured according to the position of the target object to obtain an image of the target object.

In some embodiments, after the position of the target object is obtained, the image collection apparatus automatically adjusts its camera to capture the image of the target object, for example, to focus on and zoom in the image of the target object or close up the target object, so that the image of the target object can be clearly captured for convenience of viewing. In other embodiments, when the focal length of the image collection apparatus before capturing the target object is just suitable for capturing the target object, the shooting angle of the image collection apparatus can be directly adjusted to capture the target object. In other embodiments, before the target object is captured, another smaller object may be closed up, and the target object is larger than the object being closed up, so the focal length needs to be adjusted appropriately to magnify the current field of view and decrease the magnification. In the embodiment of the present disclosure, the user does not need to manually operate the image collection apparatus when the target object needs to be captured, so that the image collection apparatus does not need to be stopped for control in scenarios such as live streaming or video conferences, which improves the smoothness and convenience of the process. In some embodiments, the provided image collection method further includes: sending the captured image to a target terminal for playing. The target terminal may be, for example, a terminal in communication connection with the image collection apparatus. For example, when the method provided in the embodiment of the present disclosure is used for a remote video conference, the target terminal may be a participant of the remote conference. When the method provided in the embodiment of the present disclosure is used for live streaming, the target terminal may be, for example, a viewer watching the live streaming.

Hereinafter, the method 200 provided in the embodiment of the present disclosure is used for a video conference scenario as an example to describe an embodiment of the present disclosure. During the remote video conference, the image collection apparatus captures a main venue, participants in branch venues participate in the remote conference through captured images, and participants in the main venue need to introduce exhibits. In order to make the participants in the branch venues have a clearer understanding of the exhibits, the camera is often adjusted to capture the exhibits. In related technologies, the participants in the main venue need to manually adjust the camera to capture the exhibits, which is inconvenient. With the method provided in the present disclosure, taking the preset object being the user's body as an example, when the participant in the main venue needs to capture an exhibit, the participant can make certain body actions, and the image collection apparatus acquires the body image of the user, then acquires the position of the exhibit according to the body image of the user and automatically adjusts the camera to capture the image of the exhibit, so that the image collection apparatus does not need to be manually adjusted during the live conference, which facilitates the introduction of the exhibit.

In some embodiments of the present disclosure, the image of the preset object includes a body image of a user or an image of a preset article. In some embodiments, the body image of the user may be a whole body image of the user or a partial body image of the user, where the number of users may be one or more, i.e., the number of users may not be limited, and the body images of a plurality of users may be collected. In some embodiments, the image of the preset article may be, for example, an image of an article such as a teaching pole or a demonstration pole.

In some embodiments of the present disclosure, after the image of the preset object is acquired and before the position of the target object is determined according to the image of the preset object, the method further includes: determining whether the image of the preset object satisfies a third preset condition; and determining the position of the target object according to the image of the preset object if the image of the preset object satisfies the third preset condition. In some embodiments, if the image of the preset object does not satisfy the third preset condition, the steps of acquiring an image of the preset object and determining whether the image of the preset object satisfies the third preset condition are repeated until the acquired body image satisfies the third preset condition. In some embodiments, the third preset condition may be, for example, that the user has made a predetermined action. By setting the third preset condition, the target object can be captured only when necessary, which helps the user to autonomously control the time for capturing the target object.

In some embodiments of the present disclosure, the image of the preset object includes a body image of a user, and determining whether the image of the preset object satisfies a third preset condition includes: determining whether the body image includes a target limb having a target action; if so, the third preset condition is satisfied; or, otherwise, the third precondition is not satisfied. In this embodiment, the target limb is specified in advance (the target limb may include, for example, at least one of a hand and an arm), and the target action is also specified in advance. The third preset condition is satisfied when the target limb is detected out and the action of the target limb is the target action. If the body image does not include the target limb or the action of the target limb is not the target action, the third preset condition is not satisfied. In practice, when the user needs to display the target object, he often performs certain body actions, for example, points to the target object with a finger, or lifts up the target object with palm, or looks at the target object. These actions all imply that the user desires to display the target object. Therefore, in some embodiments, the target limb having a target action includes at least one of a finger pointing to the object, a hand lifting up the object, a hand holding the object and eyes looking at the object, such actions may be set as the target action, and the limb performing the action is the target limb. The action is performed by the user naturally when the target object needs to be displayed. In this way, the user does not need to perform additional actions, and the whole process is natural and smooth without feeling abrupt. In this embodiment, the state of the target limb can be determined by monitoring the feature point of the target limb in real time, so as to determine whether to capture the target object.

In some embodiments, the image of the preset object includes an image of a preset article, and determining whether the image of the preset object satisfies a third preset condition includes: determining whether the preset article in the image of the preset article is held and points to the object; if so, the third preset condition is satisfied, or, otherwise, the third preset condition is not satisfied. In some embodiments, the preset article may be an article such as a demonstration pole, and may be used to point to the target object. When the user uses the preset article, he holds the preset article and points to the target object. Therefore, when it is detected that the article is held and points to any object, it indicates that the user is about to display the pointed article, which satisfies the third preset condition. When the preset article is not held, it indicates that the user is not using the preset article. When the preset article is held but does not point to any object, it indicates that the user may just hold the article in hand and is not using it. In some embodiments, the preset article pointing to any object may indicate that there is an object within a distance threshold near a preset feature point of the preset article.

In some embodiments, determining the position of a target object according to the image of the preset object includes: acquiring the position of a feature point of the preset object in the image of the preset object; and determining the position of the target object according to the position of the feature point of the preset object. In some embodiments, the distance between the preset object and the target object is often short, so the position of the target object can be determined according to the position of the feature point on the preset object. For example, in some embodiments, the image of the preset object includes a body image of a user, and determining the position of a target object at this time includes: determining the position of the target object according to the body image. In some embodiments, when the user desires to introduce the target object, the user's body often performs corresponding actions, which identify the position of the target object, so the position of the target object can be determined according to the body image of the user. For example, the user usually points to the target object with his finger, or the user's eyes look at the target object. At this time, the position of the target object can be determined according to the pointing of the user's finger or the direction of the user's line of sight. In some embodiments, determining the position of the target object according to the body image includes: acquiring the position of a feature point of a target limb in the body image; and determining the position of the target object according to the position of the feature point of the target limb. In this embodiment, the target limb is preset. The target limb may be a limb related to the target object, for example, may be a limb operating the target object. For example, the target limb may be set to include at least one of a hand and an arm. Generally, when the target object needs to be displayed, the user points to the target object with his finger or holds the target object by hands, so the position of the target object can be determined by the position of the feature point of the target limb.

In some embodiments, determining the position of the target object according to the position of the feature point of the preset object may include, for example: positioning a target range with the feature point of the preset object as the center of a circle and a preset distance as the radius, and positioning the target object within the target range. In some embodiments, the preset object may be a target limb of a user. Considering that the user usually uses the target limb (e.g. a hand) to point to or hold the target object, the target object is usually located near the feature point of the target limb, so the target object can be searched and positioned near the feature point of the target limb. In some embodiments, the preset object is a preset article, and then the target object is positioned near the feature point of the preset article.

In some embodiments, capturing the target object to obtain an image of the target object includes: adjusting an angle of view during capturing, and/or adjusting a focal length during capturing, to capture the target object. In this embodiment, the target object may not be located in the current field of view before the target object is captured, and the focal length used may not be appropriate, so the angle of view and/or the focal length for capturing need to be adjusted when the target object is captured, which improves the capturing effect.

In some embodiments, the angle of view during capturing is adjusted, so that the target object is located in the middle of the captured image. In some embodiments, the target object is captured in order to display the target object, so the angle of view during capturing is adjusted to display the target object more clearly.

In some embodiments, the focal length is adjusted to increase the magnification during capturing. The focal length is adjusted to increase the magnification during capturing. In some embodiments, when the target object is captured to show details of the target object so that others can view the details and close-up of the target object at short range, the focal length needs to be adjusted to increase the magnification during capturing. Increasing the magnification here indicates that the magnification of the image collection apparatus when the target object is captured is greater than the magnification of the image collection apparatus before the target object is captured, for example, if the magnification of the image collection apparatus when the voice information is acquired is 1, the magnification when the target object is captured should be greater than 1. By increasing the magnification, the image of the captured target object can be magnified, so that the details of the target object can be captured and the target object can be closed up.

In some embodiments, adjusting a focal length during capturing includes: adjusting the focal length during capturing according to the size of a display screen, where the display screen is used for displaying the captured image. In this embodiment, the focal length of the image collection apparatus during capturing is related to the size of the display screen for display, for example, the focal length during capturing may be set and adjusted, so that the size of the image of the captured target object on the display screen is not less than a target size, and/or the ratio of the area of the image of the captured target object on the display screen to the area of the display screen is not less than a target ratio. For example, the focal length is adjusted, so that the size of the captured target object in the horizontal and vertical directions of the display screen is not less than 10 cm. In addition, the area of the image of the captured target object is set to be not less than 75% of the area of the display screen. In this way, when the size of the display screen is small, the focal length can be automatically adjusted to ensure that the captured image of the target object is large enough, and when the size of the display screen is large, the focal length can be automatically adjusted with the area of the display screen, without causing the captured image of the target object to be too small.

In some embodiments, the method further includes acquiring a voice instruction, and adjusting, according to the voice instruction, the angle of view and/or focal length during capturing. In some embodiments, the angle of view and/or focal length when the target object is captured may be controlled by voice and further adjusted, where the voice instruction may be included in the voice information, and the user may send out voice information including the voice instruction.

In some embodiments of the present disclosure, the method further includes: acquiring voice information; determining whether the acquired voice information satisfies a fourth preset condition; and adjusting the image collection apparatus to a second state if the acquired voice information satisfies the fourth preset condition, where the second state is a state of the image collection apparatus before the target object is captured to obtain an image of the target object. The fourth preset condition in this embodiment may be, for example, that the acquired voice information includes preset target words. When it is identified that the acquired voice information includes the target words, the state of capturing the target object is exited, and the second state before step S203 is returned, for example, the angle of view and focal length of the image collection apparatus before step S203 may be recorded, and the angle of view and focal length of the image collection apparatus are adjusted to the angle of view and focal length recorded before step S203. In other embodiments, the user captured by the image collection apparatus and the focal length used before step S203 may be recorded, and when the acquired voice information satisfies the fourth preset condition, the image collection apparatus is controlled to capture the recorded user again at the recorded focal length.

In some embodiments of the present disclosure, an image collection method 300 is further provided. The method in this embodiment is explained by a video conference as an example. A video conference system is started, an image collection device captures the venue, and all parties join the conference, open voice detection threads, and monitor voice information. When the voice information sent by a user is monitored, whether preset keywords are identified in the voice information is determined. If the preset keywords are not identified, the monitoring of voice information continues. If the preset keywords are identified, it indicates that the user desires to display the target object. Then, a body image of the user is acquired, feature points such as hands and bones in the body image are identified, and whether the identified feature points include a target feature point is determined. The target feature point here may be, for example, a hand feature point. If the target feature point is included, the coordinates of the displayed object are positioned according to the coordinates of the target feature point, a new angle of view is computed with the coordinates of the displayed object as the center and the size of a display screen as the reference, the direction and focal length of the image collection apparatus are adjusted at this angle of view to magnify the details of the displayed object, and detailed pictures are sent to the remote participants, so that the remote participants can view the details of the displayed object. When the details of the displayed object do not need to be displayed, voice information is sent out again. If the voice information sent out again includes a preset close-up stop command, the detail close-up of the displayed object is exited, and initial pictures are output. The initial pictures may be, for example, pictures captured from the displayed object at the angle of view and focal length before the close-up.

Figure 4:
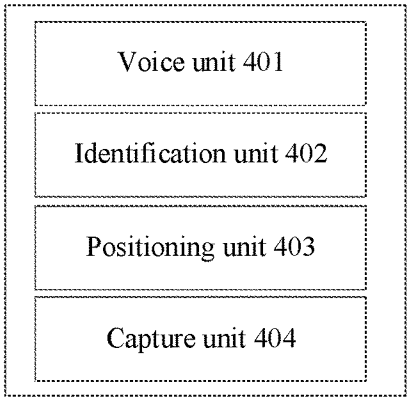
FIG. 4 is a composition diagram of an image collection apparatus according to an embodiment of the present disclosure.

In some embodiments of the present disclosure, as shown in FIG. 4, an image collection apparatus is further provided, including: a voice unit 401, configured to acquire voice information;

- an identification unit 402, configured to determine whether the voice information satisfies a first preset condition;
- a positioning unit 403, configured to determine the position of a target object if the voice information satisfies the first preset condition; and
- a capture unit 404, configured to capture the target object according to the position of the target object to obtain an image of the target object.

In some embodiments, the positioning unit 403 determining the position of a target object includes: acquiring a body image of a user and determining the position of the target object according to the body image of the user.

The positioning unit 403 determining the position of the target object according to the body image of the user includes: determining whether the body image includes a feature point of a target limb; if the body image includes the feature point of the target limb, determining the position of the target object according to the position of the feature point of the target limb; or, if the body image does not include the feature point of the target limb, re-acquiring a body image of the user.

In some embodiments, the positioning unit 403 determining the position of the target object according to the position of the feature point of the target limb includes: determining a target range with the feature point of the target limb as the center and a preset distance as the radius; and positioning the target object within the target range to determine the position of the target object; or, searching and positioning the target object near the feature point of the target limb.

In some embodiments, the target limb includes at least one of a hand and an arm.

In some embodiments, the capture unit 404 capturing the target object to obtain an image of the target object includes: adjusting an angle of view during capturing, and/or adjusting a focal length during capturing, to capture the target object.

In some embodiments, the capture unit 404 adjusts the angle of view during capturing, so that the target object is located in the middle of the captured image. In some embodiments, the capture unit 404 adjusts the focal length to increase the magnification during capturing.

In some embodiments, the capture unit 404 adjusting a focal length during capturing includes: adjusting the focal length during capturing according to the size of a display screen, where the display screen is used for displaying the captured image.

In some embodiments, the voice unit 401 is further configured to acquire a voice instruction. The capture unit 404 is further configured to adjust, according to the voice instruction, the angle of view and/or focal length during capturing.

In some embodiments, the voice unit 401 is further configured to acquire voice information again. The identification unit 402 is further configured to determine whether the voice information acquired again satisfies a second preset condition. The capture unit 404 is further configured to adjust the image collection apparatus to a first state if the voice information acquired again satisfies the second preset condition, where the first state is a state of the image collection apparatus before the target object is captured to obtain an image of the target object.

In some embodiments, the identification unit 402 determining whether the voice information satisfies a first preset condition includes: determining whether the voice information includes preset keywords; if the voice information includes the keywords, the first preset condition is satisfied; or, if the voice information does not include the keywords, the first preset condition is not satisfied.

Figure 5:
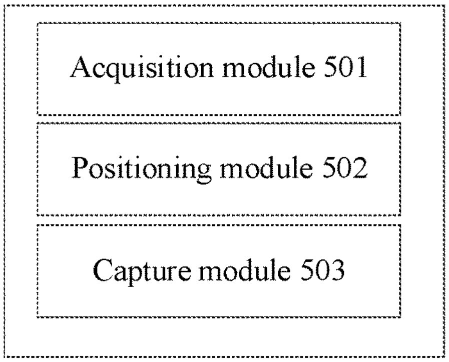
FIG. 5 is a composition diagram of another image collection apparatus according to an embodiment of the present disclosure.

In some embodiments of the present disclosure, as shown in FIG. 5, an image collection apparatus is further provided, including:

- an acquisition module 501, configured to acquire an image of a preset object;
- a positioning module 502, configured to determine the position of a target object according to the image of the preset object; and
- a capture module 503, configured to capture the target object according to the position of the target object to obtain an image of the target object.

In some embodiments, the image of the preset object includes a body image of a user or an image of a preset article.

In some embodiments, the image collection apparatus further includes a determination module configured to determine whether the image of the preset object satisfies a third preset condition after the acquisition module 501 acquires the image of the preset object and before the positioning module 502 determines the position of the target object according to the image of the preset object; and the positioning module 502 is configured to determine the position of the target object according to the image of the preset object if the image of the preset object satisfies the third preset condition.

In some embodiments, the image of the preset object includes a body image of a user. The determination module determining whether the image of the preset object satisfies a third preset condition includes: determining whether the body image includes a target limb having a target action; if so, the third preset condition is satisfied; or, otherwise, the third precondition is not satisfied.

In some embodiments, the image of the preset object includes an image of a preset article; the determination module determining whether the image of the preset object satisfies a third preset condition includes: determining whether the preset article in the image of the preset article is held and points to any object; if so, the third preset condition is satisfied, or, otherwise, the third preset condition is not satisfied.

In some embodiments, the target limb having a target action includes at least one of a finger pointing to the object, a hand lifting up the object, a hand holding the object and eyes looking at the object.

In some embodiments, the positioning module 502 determining the position of a target object according to the image of the preset object includes: acquiring the position of a feature point of the preset object in the image of the preset object; and determining the position of the target object according to the position of the feature point of the preset object.

In some embodiments, the positioning module 502 determining the position of the target object according to the position of the feature point of the preset object includes: determining a target range with the feature point of the preset object as the center and a preset distance as the radius; and positioning the target object within the target range to determine the position of the target object; or, searching and positioning the target object near the feature point of the preset object.

In some embodiments, the target limb includes at least one of a hand and an arm.

In some embodiments, the capture module 503 capturing the target object to obtain an image of the target object includes: adjusting an angle of view during capturing, and/or adjusting a focal length during capturing, to capture the target object.

In some embodiments, the capture module 503 adjusts the angle of view during capturing so that the target object is located in the middle of the captured image; and/or, adjusts the focal length to increase the magnification during capturing.

In some embodiments, the capture module 503 adjusting a focal length during capturing includes: adjusting the focal length during capturing according to the size of a display screen, where the display screen is used for displaying the captured image.

In some embodiments, a voice module is further included to acquire a voice instruction. The positioning module 502 is further configured to determine the position of the target object according to the image of the preset object or adjust the angle of view and/or focal length during capturing according to the voice instruction when the voice instruction satisfies a preset condition.

In some embodiments, the voice module is further configured to acquire voice information. The determination module is further configured to determine whether the acquired voice information satisfies a fourth preset condition. The capture module 503 is further configured to adjust the image collection apparatus to a second state if the acquired voice information satisfies the fourth preset condition, where the second state is a state of the image collection apparatus before the target object is captured to obtain an image of the target object.

The embodiments of the apparatuses substantially correspond to the embodiments of the methods, so relevant parts may refer to the parts of the embodiments of the methods. The embodiments of the apparatuses described above are merely illustrative, where the modules illustrated as separate modules may or may not be separate. Some or all of the modules may be selected according to actual needs to achieve the objectives of the solutions of the embodiments. Those of ordinary skill in the art can understand and implement without any creative effort.

The methods and apparatuses of the present disclosure are described above based on the embodiments and application examples. In addition, the present disclosure further provides a terminal and a storage medium, which are described below.

Figure 6:
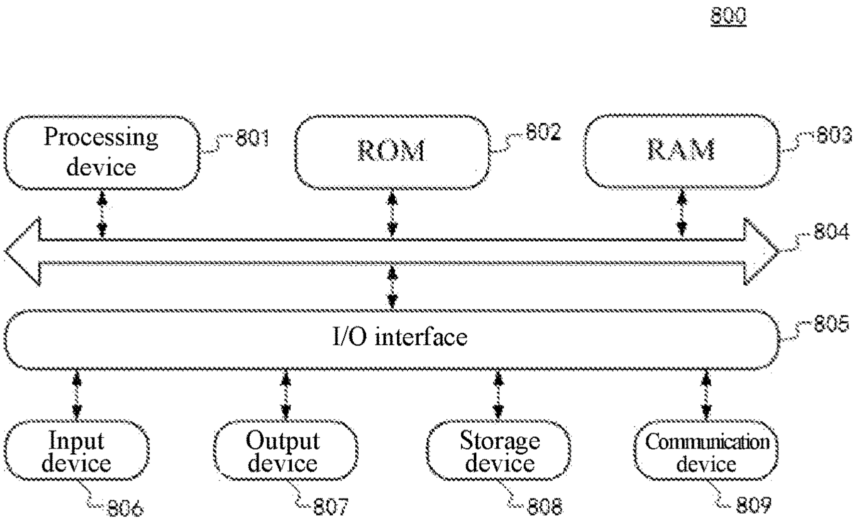
FIG. 6 is a schematic structural diagram of an electronic device according to an embodiment of the present disclosure.

Reference is made below to FIG. 6, which illustrates a schematic diagram of the structure of an electronic device (e.g., a terminal device or a server) 800 suitable for use in implementing embodiments of the present disclosure. Terminal devices in embodiments of the present disclosure may include, but are not limited to, mobile terminals such as a cell phone, a laptop computer, a digital radio receiver, a PDA (personal digital assistant), a PAD (tablet computer), a PMP (portable multimedia player), an in-vehicle terminal (e.g., an in-vehicle navigation terminal), and the like, and a fixed terminal such as a digital TV, a desktop computer, and the like. The electronic device illustrated in the figures is only an example and should not impose any limitation on the functionality and scope of use of embodiments of the present disclosure.

The electronic device 800 may include a processing device (e.g., a central processor, graphics processor, etc.) 801 that may perform various appropriate actions and processes based on programs stored in a read-only memory (ROM) 802 or loaded from a storage device 808 into a random access memory (RANI) 803. Also stored in RANI 803 are various programs and data required for the operation of electronic device 800. The processing device 801, ROM 802, and RANI 803 are connected to each other via bus 804. The input/output (I/O) interface 805 is also connected to the bus 804.

Typically, the following devices can be connected to I/O interface 805: input devices 806 including, for example, touch screens, touch pads, keyboards, mice, cameras, microphones, accelerometers, gyroscopes, etc.; output device 807 including, for example, liquid crystal displays (LCDs), speakers, vibrators, etc.; storage device 808 including, for example, magnetic tapes, hard drives, etc.; and communication device 809. communication device 809 may allow the electronic device 800 to communicate wirelessly or wired with other devices to exchange data. While the drawings illustrate the electronic device 800 with various devices, it should be understood that it is not required to implement or have all of the devices illustrated. More or fewer devices may alternatively be implemented or available.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication device 809, or from a storage device 808, or from a ROM 802. When this computer program is executed by the processing device 801, the above-described functions as defined in the method of this disclosed embodiment are performed.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above. magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted by any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LAN"), wide area networks ("WAN"), internetworks (e.g., the Internet), and end-to-end networks (e.g., ad hoc end-to-end networks), as well as any currently known or future developed networks.

The above-mentioned computer-readable medium may be included in the above-mentioned electronic device; or may be separate and not assembled into the electronic device.

The above computer readable medium carries one or more programs that, when executed by the electronic device, cause the electronic device to perform the methods of the present disclosure as described above.

Computer program code for performing the operations of the present disclosure may be written in one or more programming languages or combinations thereof, said programming languages including object-oriented programming languages—such as Java, Smalltalk, C++, and also including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in the embodiments of the present disclosure may be implemented by means of software, or they may be implemented by means of hardware. Wherein, the name of the unit does not in some cases constitute a limitation of the unit itself.

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. Machine readable media may include, but are not limited to, electronic, magnetic, optical, electromagnetic, infrared, or semiconductor systems, devices, or apparatus, or any suitable combination of the foregoing. More specific examples of machine-readable storage media would include one or more wire-based electrical connections, portable computer disks, hard disks, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above any suitable combination of the above.

According to one or more embodiments of the present disclosure, provide an image collection method, used for an image collection apparatus, comprising:

acquiring voice information;

determining whether the voice information satisfies a first preset condition;

determining the position of a target object if the voice information satisfies the first preset condition; and capturing the target object according to the position of the target object to obtain an image of the target object.

According to one or more embodiments of the present disclosure, provide an image collection method, the determining the position of a target object comprises: acquiring a body image of a user, and determining the position of the target object according to the body image of the user.

According to one or more embodiments of the present disclosure, provide an image collection method, determining the position of the target object according to the body image of the user comprises:

determining whether the body image comprises a feature point of a target limb; and if the body image comprises the feature point of the target limb, determining the position of the target object according to the position of the feature point of the target limb; or if the body image does not comprise the feature point of the target limb, re-acquiring a body image of the user.

According to one or more embodiments of the present disclosure, provide an image collection method, determining the position of the target object according to the position of the feature point of the target limb comprises: determining a target range with the feature point of the target limb as the center and a preset distance as the radius; and positioning the target object within the target range to determine the position of the target object; or, searching and positioning the target object near the feature point of the target limb.

According to one or more embodiments of the present disclosure, provide an image collection method, the target limb comprises at least one of a hand and an arm.

According to one or more embodiments of the present disclosure, provide an image collection method, capturing the target object to obtain an image of the target object comprises:

adjusting an angle of view during capturing, and/or adjusting a focal length during capturing, to capture the target object.

According to one or more embodiments of the present disclosure, provide an image collection method, the angle of view during capturing is adjusted, so that the target object is located in the middle of the captured image;

and/or, the focal length is adjusted to increase the magnification during capturing.

According to one or more embodiments of the present disclosure, provide an image collection method, the adjusting a focal length during capturing comprises:

adjusting the focal length during capturing according to the size of a display screen, wherein the display screen is used for displaying the captured image.

According to one or more embodiments of the present disclosure, provide an image collection method, further comprising:

acquiring a voice instruction; and adjusting, according to the voice instruction, the angle of view and/or focal length during capturing.

According to one or more embodiments of the present disclosure, provide an image collection method, further comprising:

acquiring voice information again;

determining whether the voice information acquired again satisfies a second preset condition; and adjusting the image collection apparatus to a first state if the voice information acquired again satisfies the second preset condition, wherein the first state is a state of the image collection apparatus before the target object is captured to obtain an image of the target object.

According to one or more embodiments of the present disclosure, provide an image collection method, used for an image collection apparatus, comprising:

acquiring an image of a preset object;

determining the position of a target object according to the image of the preset object; and capturing the target object according to the position of the target object to obtain an image of the target object.

According to one or more embodiments of the present disclosure, provide an image collection method, the image of the preset object comprises a body image of a user or an image of a preset article.

According to one or more embodiments of the present disclosure, provide an image collection method, after acquiring an image of a preset object and before determining the position of a target object according to the image of the preset object, the method further comprises: determining whether the image of the preset object satisfies a third preset condition; and determining the position of the target object according to the image of the preset object if the image of the preset object satisfies the third preset condition.

According to one or more embodiments of the present disclosure, provide an image collection method, the image of the preset object comprises a body image of a user; determining whether the image of the preset object satisfies a third preset condition comprises:

determining whether the body image comprises a target limb having a target action; if so, the third preset condition is satisfied; or, otherwise, the third precondition is not satisfied;

According to one or more embodiments of the present disclosure, provide an image collection method, the image of the preset object comprises an image of a preset article; determining whether the image of the preset object satisfies a third preset condition comprises: determining whether the preset article in the image of the preset article is held and points to the object; if so, the third preset condition is satisfied, or, otherwise, the third preset condition is not satisfied.

According to one or more embodiments of the present disclosure, provide an image collection method, the target limb having a target action comprises: at least one of a finger pointing to the object, a hand lifting up the object, a hand holding the object and eyes looking at the object.

According to one or more embodiments of the present disclosure, provide an image collection method, determining the position of a target object according to the image of the preset object comprises: acquiring the position of a feature point of the preset object in the image of the preset object; and determining the position of the target object according to the position of the feature point of the preset object.

According to one or more embodiments of the present disclosure, provide an image collection method, determining the position of the target object according to the position of the feature point of the preset object comprises: determining a target range with the feature point of the preset object as the center and a preset distance as the radius; and positioning the target object within the target range to determine the position of the target object; or, searching and positioning the target object near the feature point of the preset object.

According to one or more embodiments of the present disclosure, provide an image collection method, the target limb comprises at least one of a hand and an arm.

According to one or more embodiments of the present disclosure, provide an image collection method, capturing the target object to obtain an image of the target object comprises: adjusting an angle of view during capturing, and/or adjusting a focal length during capturing, to capture the target object.

According to one or more embodiments of the present disclosure, provide an image collection method, the angle of view during capturing is adjusted, so that the target object is located in the middle of the captured image;

and/or, the focal length is adjusted to increase the magnification during capturing.

According to one or more embodiments of the present disclosure, provide an image collection method, the adjusting a focal length during capturing comprises:

adjusting the focal length during capturing according to the size of a display screen, wherein the display screen is used for displaying the captured image.

According to one or more embodiments of the present disclosure, provide an image collection method, further comprising:

acquiring a voice instruction, and determining the position of the target object according to the image of the preset object or adjusting the angle of view and/or focal length during capturing according to the voice instruction when the voice instruction satisfies a preset condition.

According to one or more embodiments of the present disclosure, provide an image collection method, further comprising:

acquiring voice information;

determining whether the acquired voice information satisfies a fourth preset condition; and adjusting the image collection apparatus to a second state if the acquired voice information satisfies the fourth preset condition, wherein the second state is a state of the image collection apparatus before the target object is captured to obtain an image of the target object.

According to one or more embodiments of the present disclosure, provide an image collection apparatus, comprising:

a voice unit, configured to acquire voice information;

an identification unit, configured to determine whether the voice information satisfies a first preset condition;

a positioning unit, configured to determine the position of a target object if the voice information satisfies the first preset condition; and a capture unit, configured to capture the target object according to the position of the target object to obtain an image of the target object.

According to one or more embodiments of the present disclosure, provide an image collection apparatus, comprising:

an acquisition module, configured to acquire an image of a preset object;

a positioning module, configured to determine the position of a target object according to the image of the preset object; and a capture module, configured to capture the target object according to the position of the target object to obtain an image of the target object.

According to one or more embodiments of the present disclosure, provide a terminal, comprising: at least one memory and at least one processor, wherein the at least one memory is configured to store program codes, and the at least one processor is configured to call the program codes stored in the at least one memory to perform the method according to any one of above.

According to one or more embodiments of the present disclosure, provide a storage medium storing program codes, the program codes used to perform the method according to any one of above.

The above description is only a better embodiment of the present disclosure and a description of the technical principles applied. It should be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed idea. For example, the above features are interchangeable with (but not limited to) technical features with similar functions disclosed in the present disclosure.

Further, while the operations are depicted in a particular order, this should not be construed to require that the operations be performed in the particular order shown or in sequential order. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, the various features described in the context of a single embodiment may also be implemented in multiple embodiments individually or in any suitable sub-combination.

Although the present subject matter has been described using language specific to structural features and/or method logical actions, it should be understood that the subject matter as defined in the appended claims is not necessarily limited to the particular features or actions described above. Rather, the particular features and actions described above are merely exemplary forms of claim fulfillment.

What is claimed is:

1. An image collection method implemented by a terminal device that comprises a processor, a memory, and a camera, the image collection method comprising:

acquiring, by the terminal device, voice information from a user;

determining, by the terminal device, whether the voice information satisfies a first preset condition;

determining, by the terminal device, a position of a target object in response to determining that the voice information satisfies the first preset condition, wherein the target object comprises an object whose image needs to be displayed on a display screen, and the determining the position of the target object comprises:

acquiring a body image of the user, wherein the body image comprises a target limb of the user, wherein the target limb performs an action that identifies the target object, and determining the position of the target object based on a feature point of the target limb;

automatically adjusting, by the terminal device, the camera based on the position of the target object, wherein the adjusting the camera comprises adjusting at least one of an angle of view or a focal length of the camera;

capturing an image of the target object by the adjusted camera; and displaying the captured image of the target object on the display screen, wherein the image collection method further comprises:

determining a target range utilizing the feature point of the target limb as a center and a preset distance as a radius, and positioning the target object within the target range to determine the position of the target object.

2. The image collection method according to claim 1, further comprising:

determining whether the body image comprises the feature point of a target limb; and in response to determining that the body image does not comprise the feature point of the target limb, acquiring another body image of the user.

3. The image collection method according to claim 1, further comprising:

searching and positioning the target object near the feature point of the target limb.

4. The image collection method according to claim 1, wherein the target limb comprises at least one of a hand or an arm.

5. The image collection method according to claim 1, further comprising:

adjusting the angle of view or the focal length during a process of capturing the image of the target object.

6. The image collection method according to claim 5, wherein the angle of view during capturing is adjusted, so that the target object is located in the middle of the captured image;

and/or, the focal length is adjusted to increase a magnification during capturing;

and/or, the adjusting a focal length during capturing comprises: adjusting the focal length during capturing according to a size of a display screen, wherein the display screen is used for displaying the captured image.

7. The image collection method according to claim 1, further comprising:

acquiring a voice instruction; and adjusting, according to the voice instruction, the angle of view and/or focal length during capturing;

and/or, the image collection method further comprising: acquiring voice information again; determining whether the voice information acquired again satisfies a second preset condition; and adjusting the image collection apparatus to a first state if the voice information acquired again satisfies the second preset condition, wherein the first state is a state of the image collection apparatus before the target object is captured to obtain an image of the target object.

8. The image collection method according to claim 1, further comprising:

determining whether the voice information comprises preset keywords;

in response to determining that the voice information comprises the keywords, the first preset condition is satisfied;

in response to determining that the voice information does not comprise the keywords, the first preset condition is not satisfied.

9. An image collection method implemented by a terminal device that comprises a processor, a memory, and a camera, the image collection method comprising:

acquiring an image of a preset object, wherein the image of the preset object comprises a body image of a user or an image of a preset article, and the preset object is associated with an action that identifies the target object;

determining a position of a target object based on a feature point of the preset object in the image of the preset object, wherein the target object comprises an object whose image needs to be displayed on a display screen;

automatically adjusting the camera based on the position of the target object, wherein the adjusting the camera comprises adjusting at least one of an angle of view or a focal length of the camera;

capturing an image of the target object by the adjusted camera; and displaying the captured image of the target object on the display screen, wherein the image collection method further comprises:

determining a target range utilizing the feature point of the preset object as a center and a preset distance as a radius, and positioning the target object within the target range to determine the position of the target object.

10. The image collection method according to claim 9, wherein after acquiring an image of a preset object and before determining the position of a target object according to the image of the preset object, the image collection method further comprises:

determining whether the image of the preset object satisfies a third preset condition; and determining the position of the target object according to the image of the preset object in response to determining that the image of the preset object satisfies the third preset condition.

11. The image collection method according to claim 10, wherein the image of the preset object comprises the body image of the user, and the determining whether the image of the preset object satisfies the third preset condition comprises:

determining whether the body image comprises a target limb having a target action; if so, the third preset condition is satisfied; or, otherwise, the third preset condition is not satisfied;

or, wherein the image of the preset object comprises an image of a preset article, and the determining whether the image of the preset object satisfies the third preset condition comprises:

determining whether the preset article in the image of the preset article is held and points to the target object; if so, the third preset condition is satisfied, or, otherwise, the third preset condition is not satisfied.

12. The image collection method according to claim 11, wherein the target limb having a target action comprises:

at least one of a finger pointing to the target object, a hand lifting up the target object, a hand holding the target object, or eyes looking at the target object; or the target limb comprises at least one of a hand and an arm.

13. The image collection method according to claim 9, wherein the determining the position of the target object according to the image of the preset object comprises:

acquiring a position of a feature point of the preset object in the image of the preset object; and determining the position of the target object according to the position of the feature point of the preset object.

14. The image collection method according to claim 13, wherein the determining the position of the target object according to the position of the feature point of the preset object comprises:

searching and positioning the target object near the feature point of the preset object.

15. The image collection method according to claim 9, further comprising:

adjusting the angle of view or the focal length during a process of capturing the image of the target object.

16. The image collection method according to claim 15, wherein the angle of view during capturing is adjusted, so that the target object is located in the middle of the captured image;

and/or, the focal length is adjusted to increase a magnification during capturing;

and/or, the adjusting the focal length during capturing comprises: adjusting the focal length during capturing according to a size of a display screen, wherein the display screen is used for displaying the captured image.

17. The image collection method according to claim 9, further comprising:

acquiring a voice instruction, and determining the position of the target object according to the image of the preset object or adjusting the angle of view and/or focal length during capturing according to the voice instruction when the voice instruction satisfies a preset condition;

and/or, the image collection method further comprising: acquiring voice information; determining whether the acquired voice information satisfies a fourth preset condition; and adjusting the image collection apparatus to a second state if the acquired voice information satisfies the fourth preset condition, wherein the second state is a state of the image collection apparatus before the target object is captured to obtain an image of the target object.

18. A terminal device, comprising:

at least one memory and at least one processor, wherein the at least one memory is configured to store program codes, and the program codes, when executed by the at least one processor, cause the at least one processor to perform operations comprising:

acquiring voice information from a user;

determining whether the voice information satisfies a first preset condition;

determining a position of a target object in response to determining that the voice information satisfies the first preset condition, wherein the target object comprises an object whose image needs to be displayed on a display screen, and the determining the position of the target object comprises:

acquiring a body image of the user, wherein the body image comprises a target limb of the user, wherein the target limb performs an action that identifies the target object, and determining the position of the target object based on a feature point of the target limb;

automatically adjusting a camera based on the position of the target object, wherein the adjusting the camera comprises adjusting at least one of an angle of view or a focal length of the camera;

capturing an image of the target object by the adjusted camera; and displaying the captured image of the target object on the display screen, wherein the operations further comprise:

determining a target range utilizing the feature point of the target limb as a center and a preset distance as a radius, and positioning the target object within the target range to determine the position of the target object.

19. The terminal device according to claim 18, the operations further comprising:

determining whether the body image comprises the feature point of a target limb; and in response to determining that the body image does not comprise the feature point of the target limb, acquiring another body image of the user.

20. The terminal device according to claim 18, the operations further comprising:

determining whether the voice information comprises preset keywords;

in response to determining that the voice information comprises the preset keywords, the first preset condition is satisfied; and in response to determining that the voice information does not comprise the keywords, the first preset condition is not satisfied.

* * * * *